Dec. 7, 1965  A. G. THOMAS  3,221,852
TORQUE CONTROL DEVICE
Filed May 13, 1963
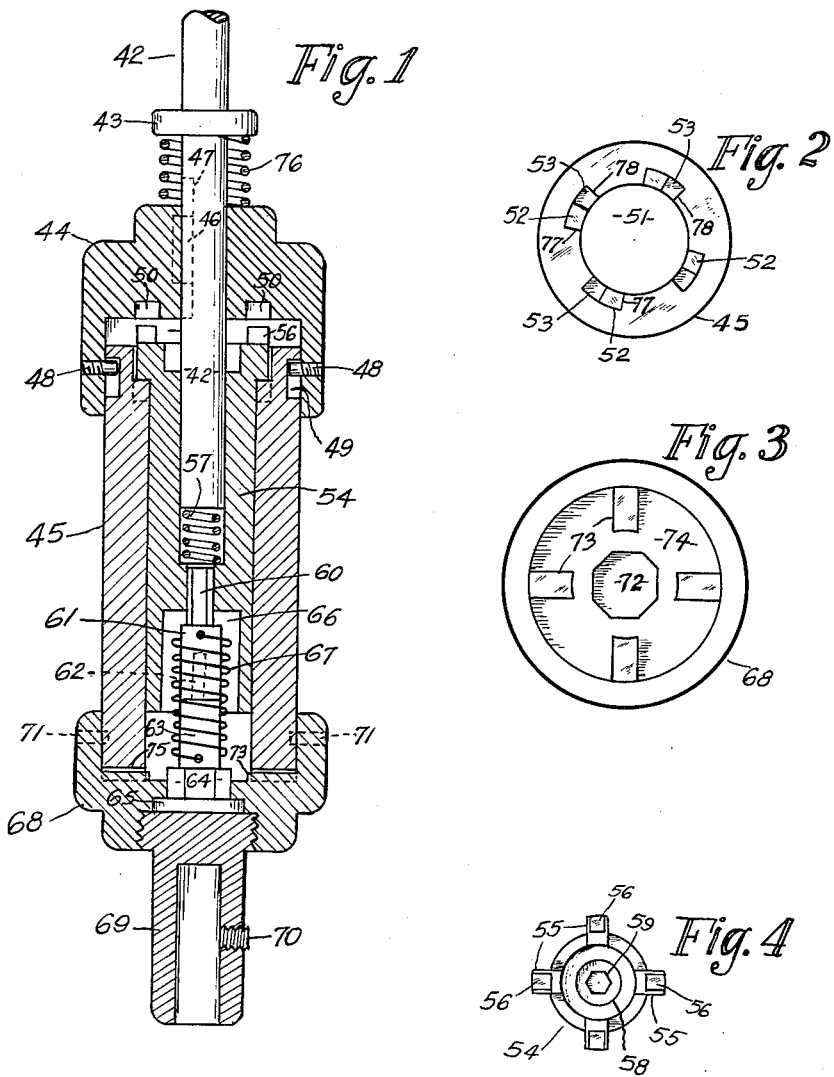
Albert G. Thomas  INVENTOR.

United States Patent Office 3,221,852
Patented Dec. 7, 1965

3,221,852
TORQUE CONTROL DEVICE
Albert G. Thomas, 133 Bollingwood Road,
Charlottesville, Va.
Filed May 13, 1963, Ser. No. 279,946
4 Claims. (Cl. 192—56)

This invention relates to devices for controlling or limiting the torque which may be applied to any member such for example, as a bolt, nut, screw, rod, or other element.

In many fastening operations or fabrication of assemblies, machines, and devices of wide variety it is often quite desirable or important to limit the stress in a bolt, screw, or other fastening member. For example, in the construction of aircraft light weight materials of limited strength are often used and so it is desirable not to overstress the material or fastening members. In such cases so-called "torque wrenches" or torque-limited screw drivers or the equivalent have been used. Such devices have not been satisfactory however since they have not gauged or controlled the applied torque very accurately. Most of them have been based on friction of spring-pressed balls in sockets, or on similar principles which do not provide sufficient accuracy for many applications.

It is an object therefore to provide a torque control device which will gauge, control, or determine torque applied to a member, with greater accuracy than provided by prior torque limiting or torque controlling devices.

Another object is to provide a torque control device which can be pre-set to limit applied torque to any predetermined value within a range of torques.

A further object is to provide a torque control wrench, screw driver, or other torque control device in which the gauging of torque is accomplished by balancing or slightly over-balancing the pre-set torque of a spring or other energy storing or resilient member.

An additional object is to provide a torque control device in which the driven member such as a wrench, or screw driver will be effectively disconnected from the source of power when the desired torque has been reached.

Another object is to provide a torque control device in which the pre-set torque will be applied to the driven wrench, screw driver or the like continuously or intermittently at a relatively rapid rate.

A further object is to provide a torque control device in which springs representing different torque ranges can be easily and quickly inserted or otherwise attached to the device.

Other objects will be evidenced in the following description.

In the drawings:

FIGURE 1 is a part sectional elevation of a torque control device in which the driving power is effectively disconnected from the driven member when the pre-set torque is reached or slightly exceeded.

FIGURE 2 is a top plan view of the principal cylindrical casing member of the device of FIGURE 5, showing steps at two different levels for supporting an inner clutch or engaging member.

FIGURE 3 is a top plan view of the bottom cap of the device shown in FIGURE 5.

FIGURE 4 is a top plan view of the inner generally cylindrical clutch or engaging member of the device shown in FIGURE 5.

FIGURE 1 shows a torque control device in which the effective connection between the driving and driven members is broken after a predetermined torque is reached. Driving shaft 42 carries integral or attached collar 43 which will through spring 76 yieldingly push upper cap 44 toward cylindrical casing member 45 when the shaft is pushed in that direction. Shaft 42 passes through a central hole in cap 44 which has key 46 working in elongated slot 47 in the shaft. This key and slot arrangement allows some axial movement of the cap relative to shaft 42 and causes rotation of cap 44 when the shaft is rotated. The key may be inserted through a radial slot in the cap or through an end slot, or the key may be in the shaft and the slot or groove can be in the cap.

Threaded pins 48, having smooth inner end portions, are screwed into threaded holes in cap 44 and the smooth end portions of the pins may be rotated in circumferential groove or slot 49 in member 45. The slot has enough axial width to allow considerable axial relative movement between cap 44 and member 45 but the pins prevent the latter from separating from the cap. The cap has a plurality of recesses or pockets 50 which may be round, or of any suitable shape but are shown as being of square cross section. These recesses are uniformly spaced and are indicated as being four in number although any suitable number can be used. A spline type construction could be used.

The member 45 has a central coaxial bore 51 as shown in FIGURE 2 and the inner upper surface has first steps 52 below the upper rim of member 45 and second steps 53 still deeper than steps 52. Four pairs of steps are shown but a greater number can be used. Inner member 54 (FIG. 1) is shaped generally as shown and has a cylindrical or annular portion rotatable in the bore 51 of member 45. As shown especially in top plan view, FIGURE 4, the member 54 has four equally spaced integral lugs or projecting portions 55 which are of rectangular cross section. These lugs carry upper, integral cubic keys 56 which are adapted to be inserted in recesses or spaces 50 in cap 44.

Compression spring 57 is placed between shaft 42 and the bottom of the bore 58 in member 54. Smaller hexagonal or otherwise shaped channel 59 is provided in member 54 to receive key or rod 60 of similar cross section. This key is integral with round rod 61 which has an axial bore to receive aligning rod 62 extending from round rod 63 which is integral with hexagonal or octagonal shoulder 64 having circular flange 65. The bottom portion of member 54 is bored to provide space 66 in which torsion spring 67 and elements 61 and 63 can be placed. The abutting edges of cylinders or rods 61 and 63 are smooth so that these members can be rotated relatively. Central rod 62 keeps the members 61 and 63 in axial alignment. One end of torsion spring 67 is fastened in a hole in member 63 and the other end of this spring is fastened in a hole in member 61. Shoulder 64 is placed in a similarly shaped central opening in lower cap 68 which is fitted over the lower end of member 45 as shown. The flange 65 fits into a circular recess and serves as a stop. Threaded socket 69 is screwed into a threaded recess in cap 68 and is coaxial with the cap. Set screw 70 may be used to fasten a screw driver, wrench, or other tool in the socket. Other types of tool holders or chucks can be used. The threads are arranged so that, in use, the socket 69 will not be unscrewed, or a set screw or other element can be used to clamp the socket in place. It is apparent that the upper surface of element 69 holds member 64–65 in place.

Cap 68 is fastened to cylindrical memebr 45 by means of screw 71. The interior of the cap is made as shown in FIGURE 3 in which the opening 72 for receiving element 64 is shown as octagonal to prevent turning of element 44 although the shape can be hexagonal or square. Radial lugs or keys 73 rise above the floor 74 of the cap and may be more in number than the four shown. These keys are adapted to fit into radially aligned notches or slots 75 cut in the bottom edge portion of the annular member 45. The slots are spaced so that the keys will match.

In operation, element 69 is removed and a unit comprising elements 61, 63, and spring 67 of the desired torque range is inserted in space 66, the hexagonal element 60 entering channnel 59 in member 54 and element 64 entering opening 72 in cap 68. Then member 69 is fastened in place as described previously. Then screws 71 are removed or adjusted and cap 68 is pulled away from member 45 just far enough to move keys 73 out of slots 75 so that cap 68 can be rotated. Under these conditions element 60 is still in channel 59 and so one end of spring 67 is held. Cap 68 is then turned in the proper direction to put the desired pre-set torque in the spring, as indicated by a suitable scale and pointer; and cap 68 is then replaced, with keys 73 entering slots 75 in the bottom edge of member 45. Screws 71 are then replaced to hold the cap on, with spring 67 wound to the pre-set torque.

If the device is held by means of shaft 42 the compression spring 76 placed between collar 43 and cap 44 will force the cap down along shaft 42 until key 46 limits the movement although a collar on the shaft could be used to limit the movement of the cap toward member 45. While shaft 42 is held the member 45 will drop to the position shown, being supported by pins 48. Under this condition the elements 56 are withdrawn from pockets 50 and so rotation of shaft 42 and keyed cap 44 will not cause rotation of inner member 54. This construction is not essential however since the cap can be arranged to be initially in driving relationship with member 54.

Now assume that member 69 is a wrench or holds a wrench which is placed over a nut on a fixed bolt. Shaft 42, attached to a handle or chuck, is pushed toward member 45 to bring the recesses 50 over keys or lugs 56, which will occur as soon as the shaft and cap 44 are rotated if they are not in alignment initially. The compression spring 76 serves to maintain the pressure on the cap in yielding manner. The width of circumferential slot 49 allows sufficient movement of the cap to bring about the clutching action described. Due to the pre-set torsion in spring 67 the lugs 55 (FIG. 4) are initially forced back against the rear walls 77 of steps 52. The lugs 55 are held in contact with walls 77, or nearly so, until the torque applied to shaft 42, clockwise as seen from the top, is approximately equal to or slightly greater than the pre-set torque. When this happens the lugs 55 are moved off shelves or steps 52 and they then drop onto deeper steps 53 which have walls 78 limiting rotary relative movement of lugs 55 and member 54. When the lugs drop to steps 53 due to pressure from spring 57 which is compressed, the lugs or keys 56 are quickly pulled or moved out of recesses 50 so that the driving connection between cap 44 and member 54 is broken. Any further rotation of shaft 42 and cap 44 therefore does not apply any further torque to the nut (not shown).

If a different range of torques is involved the element 69 can be removed and a unit comprising a different spring 67 and associated members 61, 63, 64 and 65 can be quickly inserted and clamped in place by screwing element 69 back in the cap. It is not essential that screws 71 be used since suitable latches, clamps, or locking devices can be employed so that cap 68 can be quickly attached to or detached from member 45.

The broad general principles of setting an initial torsion in a spring or energy storage system and then balancing this pre-set torque by the applied torque and using the balanced or nearly balanced condition to accomplish desired torque-limiting results appears to be highly novel. This principle makes possible a degree of accuracy in torque control devices not previously obtainable.

It is obvious that many changes of details of construction can readily be made without departing from the broad principles which I have disclosed. For instance, a torque control device for either direction of rotation can be made by employing one set of cams and a spring for clockwise rotation and another set of cams and a spring for counter clockwise rotation. Either set may be made effective by means of a suitable latch, clutch, or other engaging or disengaging device.

What I claim is:

1. In a torque control device, a cylindrical casing member, a first cap on one end of said casing member and rotatable relative thereto, an inner member coaxial with said casing member and rotatable through a limited angle relative thereto, means for connecting said cap to said inner member, means on said casing member for supporting said inner member so that said connecting means operatively connects said cap and said inner member, said casing member having other support means for supporting said inner member in position to break the driving relationship between said cap and said inner member, another cap for the other end of said casing member and rotatably settable relative thereto, means for attaching a tool to said other cap, torsion spring means connecting said inner member and said other cap, and a rod axially movable relative to said first cap and keyed thereto, said rod serving to apply torque to said first cap and for moving said inner member into position to break said driving relationship.

2. The torque control device as described in claim 1 and a spring between the inner end of said rod and said inner member.

3. The torque control device as described in claim 1, said torsion spring means including two coaxial relatively rotatable members, one of said members having an element engaging said inner member to be rotated thereby but allowing relative axial movement between said element and said inner member, and said torsion spring surrounding said relatively rotatable members and attached thereto.

4. The torque control device as described in claim 3, each said coaxial relatively rotatable member having an extension for setting a predetermined stress in said torsion spring.

References Cited by the Examiner

UNITED STATES PATENTS

| | | | |
|---|---|---|---|
| 1,322,119 | 11/1919 | Kiwul | 64—29 |
| 1,593,732 | 7/1926 | Street | 192—56 |
| 1,628,184 | 5/1927 | Pestel | 192—56 |
| 2,250,736 | 7/1941 | Torresen | 64—29 |
| 2,268,373 | 12/1941 | Cartlidge | 64—30 |
| 2,378,956 | 6/1945 | Thorner | 64—29 |
| 2,587,712 | 3/1952 | Dodge | 64—29 |
| 2,775,327 | 12/1956 | Gearhart | 192—56 |

BROUGHTON G. DURHAM, *Primary Examiner.*

ROBERT C. RIORDAN, *Examiner.*